US007469550B2

(12) United States Patent
Chapman, Jr. et al.

(10) Patent No.: US 7,469,550 B2
(45) Date of Patent: Dec. 30, 2008

(54) SYSTEM AND METHOD FOR CONTROLLING APPLIANCES AND THERMOSTAT FOR USE THEREWITH

(75) Inventors: John Gilman Chapman, Jr., Delaware, OH (US); Nicholas Ashworth, Dublin, OH (US); Robert Burt, Columbus, OH (US); Timothy E. Wallaert, Wylie, TX (US); Joseph P. Rao, Dublin, OH (US)

(73) Assignee: Robertshaw Controls Company, Carol Stream, IL (US)

( * ) Notice: Subject to any disclaimer, the term of this patent is extended or adjusted under 35 U.S.C. 154(b) by 83 days.

(21) Appl. No.: 11/412,399

(22) Filed: Apr. 27, 2006

(65) Prior Publication Data

US 2006/0208099 A1    Sep. 21, 2006

Related U.S. Application Data

(63) Continuation-in-part of application No. 11/031,255, filed on Jan. 6, 2005.

(60) Provisional application No. 60/535,289, filed on Jan. 8, 2004.

(51) Int. Cl.
*G05D 23/12* (2006.01)
*F25D 15/00* (2006.01)

(52) U.S. Cl. .............. 62/157; 62/231; 62/331; 236/22; 236/46 C

(58) Field of Classification Search ............... 62/157, 62/231, 331; 236/22, 46 C, 46 R, 51, 94, 236/1 C, 91 R, 91 D, 91 F; 700/276
See application file for complete search history.

(56) References Cited

U.S. PATENT DOCUMENTS

| | | | |
|---|---|---|---|
| 3,930,611 A | 1/1976 | Demaray | |
| 4,282,591 A | 8/1981 | Andreuccetti | |
| 4,288,990 A | 9/1981 | Schulz | |
| 4,462,540 A | 7/1984 | Dytch | |
| 4,969,508 A | 11/1990 | Tate et al. | |
| 5,082,173 A | 1/1992 | Poehlman et al. | |
| 5,271,558 A | 12/1993 | Hampton | |
| 5,272,477 A | 12/1993 | Tashima et al. | |
| 5,289,362 A * | 2/1994 | Liebl et al. | 700/22 |

(Continued)

FOREIGN PATENT DOCUMENTS

| | | |
|---|---|---|
| GB | 2 408 592 | 6/2005 |
| WO | WO 01/78307 | 10/2001 |
| WO | WO 2005/071510 A1 | 8/2005 |

OTHER PUBLICATIONS

Theta Engineering, "Smart" Thermostat, website, date last visited Oct. 26, 2006, previously visited Oct. 27, 2005, 3 pages, http://www.thetaeng.com/SmartThermostat.htm.
Search Report, Great Britain Application No. 0708157.3; Date of search Jul. 26, 2007; 2 pages.

*Primary Examiner*—Marc E Norman
(74) *Attorney, Agent, or Firm*—Reinhart Boerner Van Deuren P.C.

(57) ABSTRACT

An energy saving control for appliances via an intelligent thermostat is provided. This intelligent thermostat provides programmatic control over the HVAC system, and provides coordinated control over the appliances. This control over the appliances is accomplished via a communications network between the intelligent thermostat and the appliances. The appliances include occupancy sensors and transmit usage and occupancy information to the intelligent thermostat. The intelligent thermostat processes this information to determine the occupancy of the dwelling. The thermostat controls the HVAC system and the appliances according to the determined occupancy of the dwelling.

18 Claims, 3 Drawing Sheets

U.S. PATENT DOCUMENTS

| | | | |
|---|---|---|---|
| 5,476,221 A * | 12/1995 | Seymour | 236/47 |
| 5,544,809 A * | 8/1996 | Keating et al. | 236/44 C |
| 5,595,342 A | 1/1997 | McNair et al. | |
| 5,801,940 A | 9/1998 | Russ et al. | |
| 5,803,357 A | 9/1998 | Lakin | |
| 5,819,840 A * | 10/1998 | Wilson et al. | 165/11.1 |
| 5,833,134 A | 11/1998 | Ho et al. | |
| 5,909,378 A * | 6/1999 | De Milleville | 700/276 |
| 5,924,486 A | 7/1999 | Ehlers et al. | |
| 6,116,512 A * | 9/2000 | Dushane et al. | 236/51 |
| 6,148,146 A | 11/2000 | Poore et al. | |
| 6,196,467 B1 * | 3/2001 | Dushane et al. | 236/46 R |
| 6,196,468 B1 * | 3/2001 | Young | 236/46 R |
| 6,213,404 B1 | 4/2001 | Dushane et al. | |
| 6,375,087 B1 | 4/2002 | Day et al. | |
| 6,449,533 B1 | 9/2002 | Mueller et al. | |
| 6,513,723 B1 | 2/2003 | Mueller et al. | |
| 6,581,846 B1 * | 6/2003 | Rosen | 236/46 R |
| 6,824,069 B2 * | 11/2004 | Rosen | 236/94 |
| 7,261,243 B2 * | 8/2007 | Butler et al. | 236/1 C |
| 2001/0048030 A1 | 12/2001 | Sharood et al. | |
| 2003/0227220 A1 * | 12/2003 | Biskup et al. | 307/116 |
| 2004/0015619 A1 | 1/2004 | Brown et al. | |
| 2004/0133314 A1 | 7/2004 | Ehlers et al. | |
| 2005/0043907 A1 | 2/2005 | Eckel et al. | |
| 2005/0150967 A1 | 7/2005 | Chapman, Jr. et al. | |
| 2005/0194457 A1 | 9/2005 | Dolan | |
| 2006/0259183 A1 | 11/2006 | Hayes et al. | |

* cited by examiner under the operation of the product until it can re-enter a fully functional mode of operation, such products generally allow the consumer to set or command when such energy saving modes are entered.

SYSTEM AND METHOD FOR CONTROLLING APPLIANCES AND THERMOSTAT FOR USE THEREWITH

CROSS-REFERENCE TO RELATED PATENT APPLICATIONS

This patent application is a continuation-in-part of co-pending U.S. patent application Ser. No. 11/031,255 filed Jan. 6, 2005, which claims the benefit of U.S. Provisional Patent Application No. 60/535,289, filed Jan. 8, 2004, the teachings and disclosure of which are hereby incorporated in their entireties by reference thereto.

FIELD OF THE INVENTION

The present invention relates generally to appliance control systems, and more particularly to remote control of appliances.

BACKGROUND OF THE INVENTION

With increasing energy costs, consumers and business owners alike are becoming more energy conscious. These consumers are demanding more energy efficiency from the products that they purchase. In response, many manufacturers have responded by producing products that are more energy efficient, and products that have energy saving modes of operation that allow additional energy savings when not in use. However, since many such energy saving modes inhibit the operation of the product until it can re-enter a fully functional mode of operation, such products generally allow the consumer to set or command when such energy saving modes are entered.

One product that is used in nearly every dwelling and building, and therefore allows the potential for tremendous energy savings, is a water heater. A water heater, in simplified terms, includes a large water storage tank and a heating element that is used to heat the water in the tank to a preset temperature. This preset temperature may be adjusted by a user via an onboard thermostat. Once a desired temperature is set, most consumers do not give their water heater another thought, as long as hot water is always available when desired.

Since the water heater works to maintain the water in its storage tank at the preset temperature, these water heaters are designed with efficient insulation to minimize heat loss to the ambient to minimize energy consumption. Many water heaters also include an energy savings mode that may be set by the consumer. This energy saving mode allows the temperature of the water in the storage tank to drop to a level, e.g. 68°Fahrenheit, so as to reduce the energy usage of the water heater. In this way, the water in the storage tank will not freeze and the energy usage of the water heater will be reduced. This mode is meant to be used during extended periods of non-use, such as for summer homes or when a family is on vacation.

Unfortunately, while most consumers think to turn back the main heating/air conditioning thermostat when they are going to be gone, many consumers never think to set the water heater into this mode. This may be because the water heater and its onboard thermostat are typically located in a basement or other infrequently accessed area. As a result, these consumers needlessly incur energy costs associated with maintaining the temperature in the water heater at the preset temperature, ready for use.

Still further, such consumers often do not take the time to go to numerous other appliances to change their operating mode, nor may they know that their appliances have a setting that reduces energy consumption if they are going to be gone for an extended period of time. Additionally, many consumers fail to take the time to even manually lower the temperature of the thermostat or put it into the vacation mode. Thus, none of the appliances or the HVAC system are switched to an energy savings mode, which results in a large quantity of wasted energy.

There exists, therefore, a need in the art for a system and method of controlling appliances and an HVAC system without requiring the consumer to manually switch the mode of the appliance.

BRIEF SUMMARY OF THE INVENTION

The present invention provides a new and improved system and method for conserving energy usage. More particularly, the present invention provides a new and improved method for conserving energy usage by a hot water heater or other appliances by coordinating power saving operation with the HVAC system, and/or by allowing a user to separately set power saving modes for the hot water heater. For coordinated operation, setting of the HVAC system into a vacation mode also automatically sets the hot water heater and/or other appliances into a vacation mode. For autonomous operation, the user may set different temperature modes of operation for the hot water heater and/or other appliances for different times of day. These different modes may include different temperature set points, different tolerance bands, temperature differentials, etc.

In one embodiment, the user is not required to manually set any particular appliance or the thermostat into an energy saving or vacation mode. Instead, the household appliances and fixtures communicate with a thermostat of the dwelling to control the energy savings and other modes of operation. Preferably, the operational status of the appliances is communicated to the thermostat so that occupancy and other states that might affect the local environment may be determined and acted upon to decrease energy consumption and increase overall occupant comfort.

In one embodiment, a heat producing appliance such as an oven, range or drier that can cause a localized rise in temperature in an occupied environment communicates with the thermostat of the house. The appliance sends information to the thermostat to indicate that it is being used and indicates that it is emitting heat into the localized environment. In response, the thermostat may accordingly activate the HVAC system to counteract the effects of the newly added heat energy in the environment.

In another embodiment of the present invention, the appliance includes at least one sensor that gathers information about the occupancy of the house. The appliance sends this information to the thermostat, which takes that information and activates, deactivates, or otherwise controls an appliance or other appliances and fixtures of the house accordingly. The occupancy sensing and determination at each appliance may be based on usage, door opening, etc. Preferably, the thermostat gathers such information from more than one source to determine if the house or dwelling is occupied. If not, the thermostat may take action to reduce the energy consumption of the appliances within the dwelling since such action will not affect th individuals who are not there.

In a further embodiment, the thermostat includes a manually operated no-occupancy mode wherein the user indicates that the dwelling will have limited or no occupancy. Based on this setting, the thermostat controls the household appliances and fixtures accordingly to reduce energy consumption and therefore cost of ownership.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
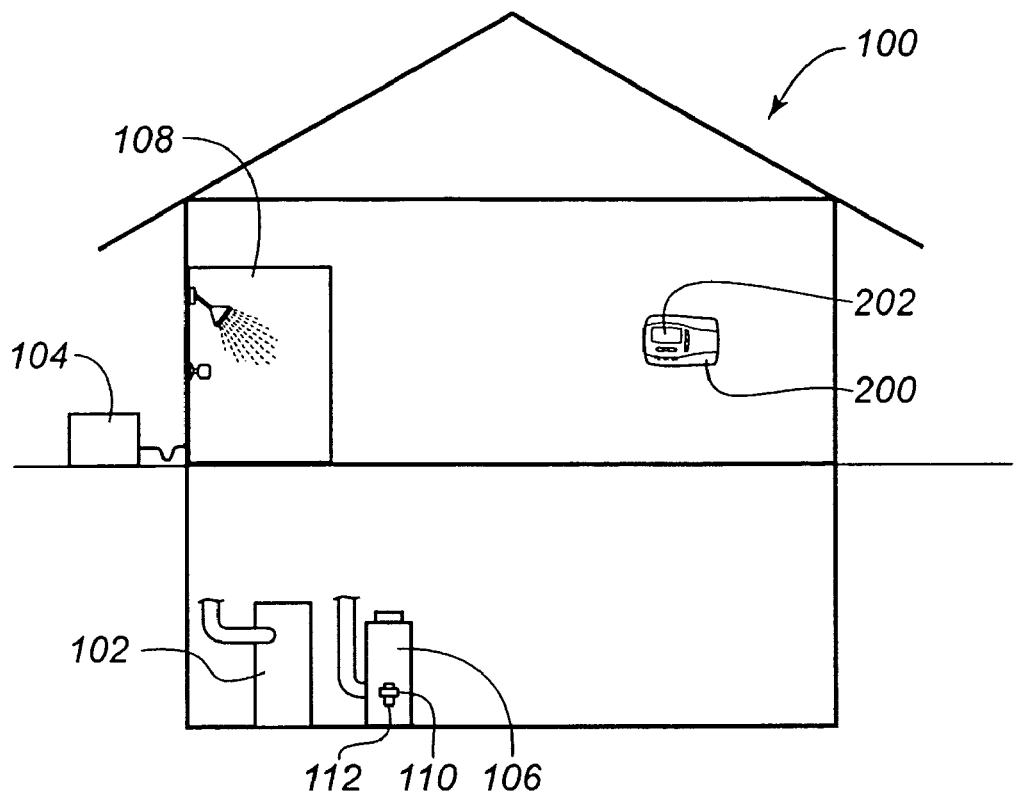
FIG. 1 is a simplified home environment diagram illustrating an environment into which the system of the present invention finds particular applicability.

FIG. 1 illustrates a simplified home environment 100 into which an embodiment of the system of the present invention finds particular applicability. However, one skilled in the art will recognize that the system of the present invention is not limited to a home environment, but may also be installed in a commercial environment, etc. This typical home environment 100 includes an intelligent thermostat 200. As is typical, the thermostat 200 controls heating of the home environment 100 by the furnace 102, and possibly cooling of the home environment 100 by the air conditioning system 104. The interface to both the furnace 102 and the air conditioning system 104 is typically pre-wired in the home environment 100, although the communications control from the thermostat 200 to the furnace 102 and to the air conditioning system 104 may also be wireless as desired by providing receiver/transmitter circuitry in the furnace 102 and air conditioning system 104. Similar receiver/transmitter circuitry is also required in thermostat 200 to provide this communications capability.

The typical home environment 100 also includes other appliances, e.g. a hot water heater 106 to provide hot water for usage in the home environment 100, for example for use in shower 108. As will be recognized by those skilled in the art, there are typically many other uses for hot water within the home environment 100 as well as within commercial environments. The typical hot water heater includes an onboard thermostat 110 that may be set by the user to a desired water temperature for the water stored within water heater 106. Typically, this onboard thermostat 110 is the only control means provided to regulate the temperature of the water in the water heater 106. This onboard thermostat most often takes the form of a simple adjustable dial with temperature markings corresponding to the temperature set points for the hot water. These onboard thermostats 110 also typically include warning designations or positional lockouts to prevent the inadvertent setting of the thermostat 110 to a setting that would result in scalding water being produced by the water heater 110.

The onboard thermostats 110 also generally include a low temperature or vacation setting. This vacation setting allows the user to reduce the energy consumption by the hot water heater 106 by reducing the temperature at which the water in the tank is maintained. Typically, such a setting results in the thermostat regulating the temperature of the water in the water heather 106 to approximately 65° F. This temperature is sufficient to prevent the water in the water heater 106 from freezing, which could result in damage to the hot water heater 106. Additionally, this temperature allows the water heater 106 to heat the water to a usable temperature within a relatively short period of time after the onboard thermostat 110 is returned to its normal setting. Unfortunately, as discussed above, since most water heaters 106 are located in generally unaccessed areas of the home environment 100, and because the user generally does not interact with the onboard thermostat 110 of the water heater 106 once originally installed, very few consumers utilize this energy-saving feature or even know of its existence.

In the system of the present invention, advantageously, the water heater 106 utilizes an electronic controller 112 to regulate the water temperature of the water heater 106. In addition to its temperature regulation function, the electronic controller 112 also includes communications capability that allows the water heater 106 to communicate with an intelligent thermostat 200. This intelligent thermostat 200, in addition to controlling the typical heating, ventilating, and air conditioning (HVAC) system components such as the furnace 102 and air conditioning unit 104, also includes programming that allows both coordinated control with the HVAC system settings as well as separate programmability of other appliance settings, e.g. the water heater settings.

While the typical communications interface between the intelligent thermostat 200 and the furnace 102 and air conditioning unit 104 is wired, the system of the present invention additionally contemplates the usage of wireless communication between the intelligent thermostat 200 and other appliances, e.g. the electronic controller 112 of the hot water heater 106.

Additionally or alternatively, the system of the present invention may also include a system BUS to which each of the individual controllable appliances and the intelligent thermostat would connect. These appliances may include but are not limited to televisions, washing machines, clothes driers, microwave ovens, ranges, stoves, refrigerators, jacuzzi's, and pool heaters. The control of other such appliances will be discussed more fully below with reference to FIG. 5. As is well-known in the art, information communicated on such a system BUS includes address information identifying and/or destination of the information transmitted thereon. Such individual addressing is not typically required in the wired network whereby each individual appliance is separately wired to the thermostat 200. Various other wired infrastructures could be utilized with the system of the present invention, and are considered within the scope thereof.

With the increasing use, sophistication, reliability, data rates, and security of wireless communication protocols, a preferred embodiment of the present invention utilizes wireless communication between the appliances and thermostat to communicate system diagnostic information and self-test control signals and operational control signals therebetween. However, it is recognized that not all of the consumer appliances may include such wireless communications capability. Therefore, a preferred embodiment to the thermostat 200 of the present invention includes the capability to communicate both wirelessly and through a wired connection.

For the wireless communication, various wireless communication protocols and standards may be implemented depending upon the particular home environment 100 in which the system is to be installed. That is, while the Bluetooth wireless standard may be utilized in a very small environment, its range limitations may make it unsuitable for larger or typical home environments 100. However, there are numerous other wireless protocols that can be utilized to provide the wireless connectivity between the thermostat 200 and the appliances for which service diagnostic information and self-test control may be provided. These other wireless protocols include, but are not limited to, the 802.11 or 802.15 family of standards. While proprietary wireless protocols may also be utilized, the use of a standard wireless protocol ensures interoperability with appliances by different manufacturers.

Figure 2:
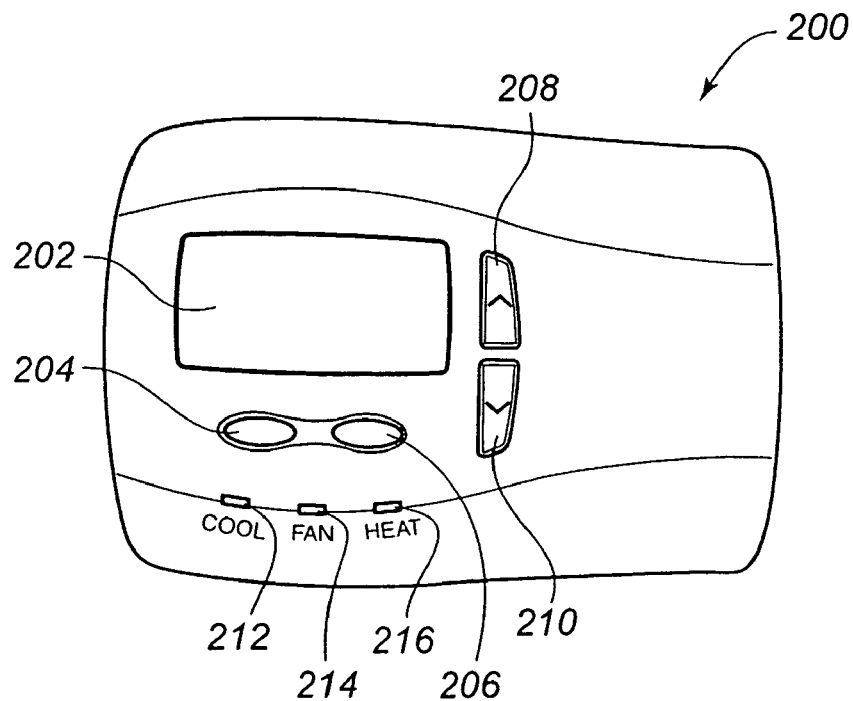
FIG. 2 is a front view illustration of an embodiment of an intelligent thermostat constructed in accordance with the teachings of the present invention.

An embodiment of a thermostat constructed in accordance with the teachings of the present invention to incorporate the features of the invention is illustrated in FIG. 2. As may be seen from this FIG. 2, this embodiment of the thermostat 200 includes a user display 202 on which is typically displayed programmatic, system, and ambient information regarding the operation of the HVAC system with which it is typically associated. This user display 202 may take various forms as are well-known in the art, and in a preferred embodiment is a dot matrix LCD display.

With such a display 202, the consumer or service person may activate various programmatic and control functions via a pair of soft keys 204, 206. The functionality executed by these soft keys 204, 206 varies dependent upon the programmatic state in which the thermostat 200 is at the time one of the soft keys 204, 206 is depressed. The particular functionality that will be instituted upon selection of one of the soft keys 204, 206 is displayed in an area of the user display 202 proximate the key 204, 206 which will institute that function. That is, the function that will be instituted upon selection of soft key 204 will be located generally in the lower left hand portion of user display 202 while the functionality that will be instituted by selection of soft key 206 will be located generally in the lower right hand portion of user display 202. These functional indicators may change depending on the program state and mode in which the thermostat is currently operating.

In addition to the soft keys 204, 206, this embodiment of the thermostat 200 of the present invention also includes adjustment keys 208, 210. These adjustment keys 208, 210 may serve to adjust a currently selected parameter up or down, such as in the case of setting the control temperature at which the thermostat will maintain the ambient environment. Additionally, these keys 208, 210 may scroll through the available data for a selected parameter, such as scrolling through alphanumeric data that may be selected for a given parameter. Such functionality will be discussed more fully below with regard to the selection of devices for which diagnostic information is desired or on which system tests are to be run. These keys 208, 210 may also function as soft keys depending on the programmatic state in which the thermostat is operating. When this functionality is provided, the function that will be instituted by selection of key 208 will be provided generally in the upper right hand corner of display 202, while the functionality that will be instituted by selection of key 210 will be displayed generally in the lower right hand corner of user display 202. In addition to the above, other user input means, such as an alphanumeric keypad, user rotatable knob, a touch screen, etc. may be utilized instead of the buttons 204-210 illustrated in the embodiment of FIG. 2.

In this embodiment, the thermostat 200 also includes operating mode visual indicators 212, 214, 216. These indicators 212-216 provide a visual indication of the current operating mode of the thermostat. In the embodiment illustrated in FIG. 2, indicator 212 will illuminate while the thermostat 200 is operating in the cooling mode. Indicator 216 will illuminate while the thermostat 200 is operating in the heating mode. Finally, indicator 214 will illuminate to indicate that the fan is operating. Depending on the particular application, this indicator 214 may illuminate whenever the fan is running, or may illuminate only when the fan is selected to run continuously.

In embodiments of the present invention that do not utilize automated switching control between the heating and cooling modes of operation, these indicators 212-216 may operate as user selectable switches to allow the consumer to select the operating mode of the thermostat 200. For example, during the summer months the consumer may select the cooling mode by depressing indicator 212. In this mode, the furnace will not be turned on even if the interior ambient temperature drops below the set point. To switch from the cooling to the heating mode of operation, the consumer, in this alternate embodiment, would need to select indicator 216 to allow the thermostat 200 to operate the furnace. Consumer selection in this embodiment of indicator 214 would operate the fan continuously, as opposed to its normal automatic operation based upon a call for cooling or heat by the thermostat 200. In a still further embodiment of the present invention, as will be discussed more fully below, the indicators 212-216 may also be utilized to provide a visual indication of system trouble or trouble with one of the appliances with which the thermostat 200 is in communication.

Having discussed the physical structure of one embodiment of a thermostat 200 constructed in accordance with the teachings of the present invention, the discussion will now focus on the operation of the water heater control which forms an aspect of the present invention. Indeed, while the following discussion will utilize the structure of the thermostat 200 illustrated in FIG. 2, those skilled in the art will recognize that various other structures can be utilized without departing from the spirit and scope of the present invention. That is, regardless of the user input mechanisms utilized by the particular embodiment of the thermostat 200 of the present invention, the communications, programmatic steps, and display information provided in the following discussion may be used.

Figure 3:
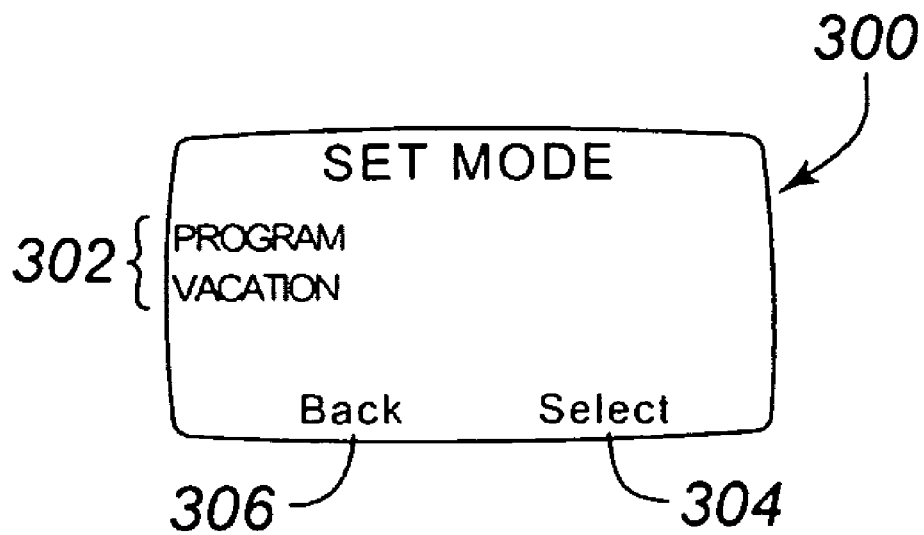
FIGS. 3-4 are exemplary user interface displays generated by an embodiment of the system of the present invention.
Figure 4:
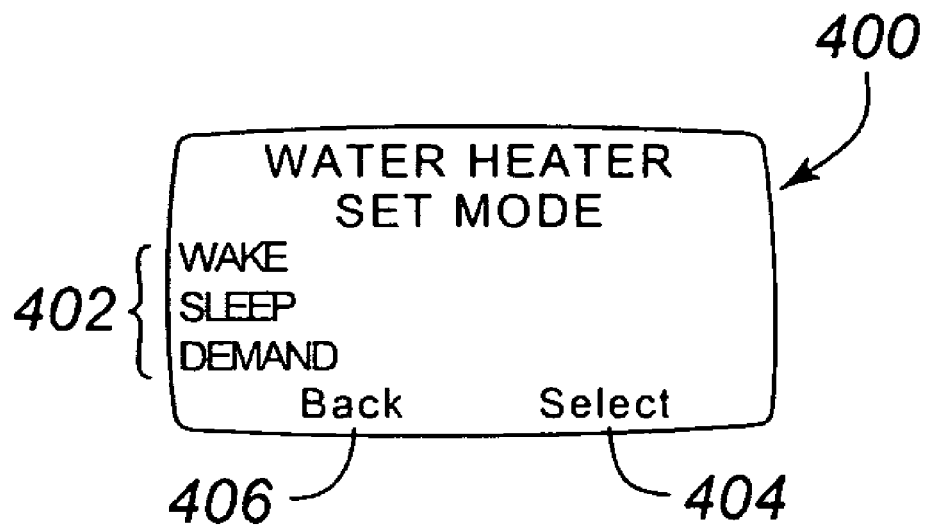

Having described an embodiment of an intelligent thermostat 200, attention is now turned to the user interface display screens generated by an embodiment of the present invention to allow user interoperability with the system of the present invention. As illustrated in FIG. 3, the intelligent thermostat 200 displays an appliance set mode screen, such as the water heater set mode screen 300 on the user interface display 202. This water heater set mode screen 300 includes a listing of the programmatic options available in area 302. In this exemplary embodiment two programmatic options are available. The first is a program setting that allows the user to program various modes of operation to ensure maximum comfort when hot water is desired and maximum energy savings at times when it is typically not in demand. The second programmatic option available in the listing of the embodiment shown in FIG. 3 is the vacation mode setting. While the preferred embodiment of the present invention automatically sets the water heater into the vacation mode when the HVAC system is set into this vacation mode, this embodiment also or alternatively allows the user to separately set the water heater into the vacation mode, regardless of the mode setting of the HVAC system. In this vacation mode, as discussed above, the water heater is allowed to reduce its energy consumption by regulating the water temperature to a low temperature, for example 65° F.

As discussed above, the user scrolls through the listing of available programmatic options by utilizing the keys 208, 210 in the embodiment shown in FIG. 2. Selection of this vacation setting will override any other programming set for the water heater 106 until the user cancels the selection. If the user were to select soft key 204, which corresponds to the back function 306, the intelligent thermostat 200 would display the screen from which the hot water heater set mode screen 300 was accessed. In one embodiment of the present invention this screen is the main menu of the thermostat 200. Selection of either of the programmatic options in area 302 is accomplished by depressing soft key 206, which corresponds to the select function 304 on the hot water heater set mode screen 300.

Assuming for a moment that the user has selected the PROGRAM option, the thermostat 200 of the present invention will display the water heater set mode screen 400. In this embodiment of the present invention, the water heater set mode screen 400 provides three programmatic modes of operation in area 402. In this embodiment the modes include a WAKE mode, a SLEEP mode, and a DEMAND mode. In each of these modes, the user may set the desired temperature set point, the temperature differential, or a combination of the two. This remote setting of the temperature set parameters is unique to the present invention.

The setting of the individual temperature set point for each of the three modes allows the user to set the desired temperature and the times of day during which each of these modes will occur. The water heater will then operate to regulate the water temperature to each of the set points during the respective modes. For embodiments of the present invention that allow setting of or operation based on temperature differentials, the actual temperature set point may remain the same, but the temperature differential may be changed. For example, the WAKE mode results in a normal temperature differential for the water heater of, for example, 15° F. That is, while the water heater is operating in the WAKE mode, the temperature of the tank is allowed to fall no lower than 15° below the set temperature. This temperature variation is sufficient for normal usage of hot water throughout the day.

The SLEEP mode of operation allows a large differential, such as 30° F. In this mode, the water heater allows the temperature of the tank to fall no lower than 30° F. below the set temperature. This mode provides the maximum operational energy savings, while still maintaining the water at a usable temperature level during the nighttime hours. The DEMAND mode of operation results in a small differential, such as 5° F. In this DEMAND mode, the water heater only allows the temperature of the water in the tank to fall no lower than 5° below the set temperature. This mode provides the most controlled water temperature, and hence the greatest energy consumption, and would typically be used only during the typical bathing times of the day.

The user is able to set the time for each of these modes of operation by first selecting one of these three programmatic modes via soft key 206 corresponding to the select function 404. Once one of the operational modes has been selected, the user may program the corresponding times for each of these modes in much the same manner as the current programming of the HVAC control modes is accomplished. As such, this process is not described in detail herein. Allowing such programming for the hot water heater allows a user to experience the lowest energy usage during night hours, comfortable water temperature during the bathing hours, and lowered energy usage during the daylight hours. For example, a user could choose to set the SLEEP mode from the hours of 10:00 PM to 5:30 AM, the DEMAND mode from 5:30 AM to 7:30 AM, and the WAKE mode from 7:30 AM to 10:00 PM. Such programming ensures energy savings while not causing the user to experience any level of discomfort or reduction in service.

While a preferred embodiment of the present invention utilizes the intelligent thermostat 200 to coordinate the system operation discussed above, the system of the present invention also contemplates the utilization of a central control point located in a user accessible area to control operation of the system. This central control point need not be a thermostat. That is, the central control point could be a separate controller having a user interface whose functionality is limited to coordination of and communication with the hot water heater. This separate controller may be a stand alone controller, may be a PC application, etc. Additionally, in embodiments of the present invention in which an intelligent thermostat provides this central control point, the user interface and the control portions of such a thermostat need not be integrated into a single housing. That is, the user interface may be mounted in a commonly user accessed area for convenience, while the control electronics could be located remotely from the user interface.

Figure 5:
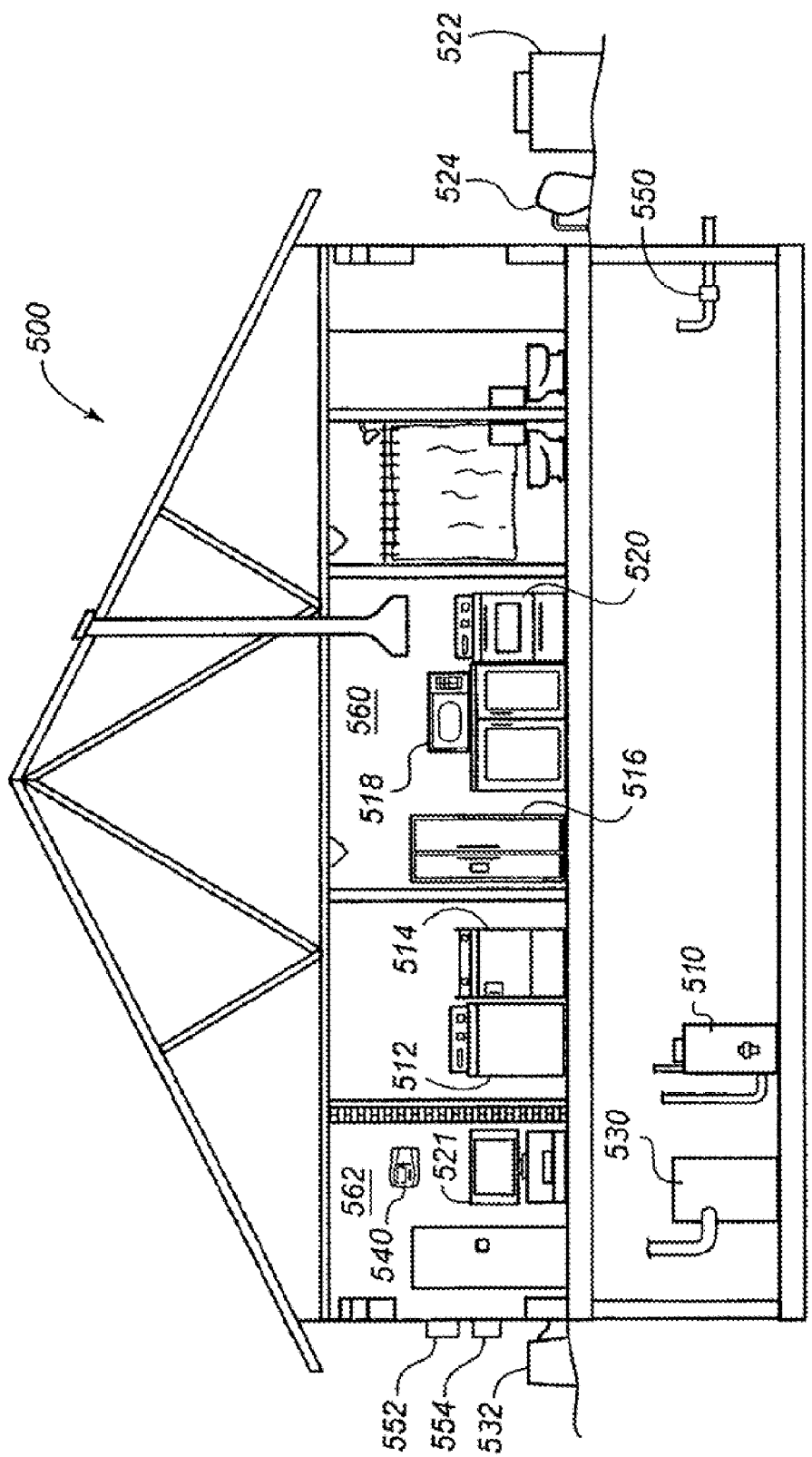
FIG. 5 is a simplified home environment diagram illustrating an environment into which an alternative embodiment of the present invention finds particular applicability.

As introduced above, FIG. 5 illustrates a further simplified home environment 500 into which an embodiment of the present invention finds particular applicability. In this embodiment, the home environment 500 includes a plurality of appliances, both inside and outside the home. Internal to the home environment 500, the appliances often include, e.g., a hot water heater 510, a washing machine 512, a clothes drier 514, a refrigerator 516, a microwave oven 518, a range/oven 520, a television 521, etc. FIG. 5 further illustrates appliances external to the home environment 500 such as a jacuzzi 522 and a heater 524 for a swimming pool. As explained above, the home environment 500 includes an HVAC system that includes at least a furnace 530 and an air conditioning unit 532.

These other appliances are similar to the hot water heater discussed previously in that the appliances advantageously utilize electronic controllers to regulate the operation thereof. Furthermore, the electronic controllers also include, among other things, communications capabilities that allow the appliances to communicate with an intelligent thermostat 540. The intelligent thermostat 540, in addition to controlling the HVAC system, includes programming that allows both coordinated control of the HVAC system as well as separate control of the appliances. Furthermore, the intelligent thermostat 540 includes programming to process information transmitted from the individual appliances to determine occupancy of the home environment 500 as well as improved control over the HVAC system, as will be explained in more detail below.

In an embodiment, the appliances include sensors to determine occupancy to assist in determining the occupancy state of the home environment 500. These occupancy sensors of a given appliance may detect physical presence of an individual, or may simply determine occupancy through sensing changes in the operational state of the given appliance and/or a user's interaction with or input to an appliance. This user interaction with the appliance can be read as useful user input information.

For example, the occupancy sensors may be linked to control inputs for the appliance such as switches, touch screens, dials, buttons, and the like. When these control inputs are manipulated by the user to change the mode or operation of an appliance, to activate the appliance, to deactivate the appliance, to set timers, to change temperature settings, and like actions, the user manipulation of the control inputs becomes a type of user input information occupancy information or input read by the occupancy sensors indicating that the home environment 500 is occupied. After occupancy information is read, the electronic controller of the appliance communicates the information to the intelligent thermostat 540. This occupancy information is a type of user input information.

Similarly, occupancy sensors may be linked to other components of the appliances such as handles, doors, lids, latches, levers, locks, and the like. When a user manipulates any of these devices, for example to use or gain access to compartments of the appliance, the user manipulation becomes occupancy information input read by the occupancy sensors indicating that the home environment 500 is occupied. Again, the electronic controller of the appliance communicates the occupancy information to the intelligent thermostat 540.

In an embodiment the intelligent thermostat 540 includes or is programmed to have a timer or other comparison means to compare the length of time between sensed pieces of occupancy information from the appliances to a predetermined or programmed length of time. When a first occupancy input is sensed by any of the occupancy sensors, the timer resets. If the predetermined length of time passes without a second piece of occupancy information sensed by any of the sensors, the intelligent thermostat 540 determines that there is no occupancy and transmits a control signal to the HVAC system and appliances according to a vacation setting or mode to reduce the energy consumption of the HVAC system and appropriate appliances.

However, if an occupancy sensor in any appliance senses a second piece of occupancy information prior to the expiration of the predetermined length of time, then the intelligent thermostat 540 determines that the home environment 500 is occupied and the timer is reset. This occupancy information may also include any manipulation of the intelligent thermostat 540 itself. In an embodiment, because the intelligent thermostat 540 has determined that the home environment 500 is occupied it will change the operational settings of the HVAC system and/or the appliances by sending a control signal to the HVAC system and the appliances to normal operation.

For example, the intelligent thermostat 540 is set to control the HVAC system and appliances according to a vacation mode if no occupancy sensor senses any occupancy information for a predetermined or user settable length of time, such as 24, 48, 96, etc. hours. If the setting is 24 hours and the last occupancy information received by the intelligent thermostat 540 occurred at 10:00 A.M., which would correspond to a first piece of occupancy information for the cycle, the occupancy timer of the intelligent thermostat 540 is reset at that time. If a second piece of occupancy information is not received by the intelligent thermostat 540 within the next 24 hours, i.e. by 09:59 A.M. of the next day, the intelligent thermostat 540 will determine that the home environment 500 is unoccupied and change the operational mode of the HVAC system and/or the appliances to a vacation setting.

However, if prior to the 24 hour time period expiring, i.e. prior to 10 A.M. of the next day, the intelligent thermostat 540 receives a second occupancy input, the intelligent thermostat 540 will determine that the home 540 is occupied and will remain in its current operational mode.

In an embodiment, if the intelligent thermostat 540 had previously put the appliances and/or the HVAC system into the vacation or energy savings setting, when the intelligent thermostat 540 receives a new piece of occupancy information, the intelligent thermostat 540 will send a control signal to cancel the vacation setting and return to a standard operating mode. This is very beneficial because the user can merely open a door to an appliance to reset the intelligent thermostat 540, the appliances, and/or the HVAC system to their respective standard operating settings.

In an embodiment of the present invention, occupancy sensors may also be applied to or even include quantity of use meters. Specifically, the home's water 550, electric 552 and/or gas 554 meters may be used to determine occupancy of the home environment 500, and are to be included in the general term "appliance." The meters in this embodiment have electronic controllers that include, among other things, communications capabilities that allow the meters to communicate with the intelligent thermostat 540. The occupancy of the home environment 500 can be determined by the quantity or rate of use of products such as electricity, gas, or water within the home by identifying changes in the rate of use or its use in general. The product usage data is a further type of user input information.

For example, if the water meter 550 does not read any use of water for a predetermined length of time such as 24 hours, the water meter 550 reads this as the home environment 500 being unoccupied. The water meter 550 sends this information to the intelligent thermostat 540 and the intelligent thermostat 540 controls the HVAC system and/or other appliances according to the vacation or energy savings setting.

Furthermore, the meters, such as the electric meter 552 and gas meter 554, that meter a product that is continuously used by the home environment 500 may also allow occupancy to be determined by analyzing the rate of use of the product. First, the intelligent thermostat 540 can compare the rate of use information to predetermined or programmed values for an unoccupied home environment 500. If the rate of use is larger than the predetermined or programmed value by a predetermined or programmed amount, the intelligent thermostat 540 determines that the home environment 500 is occupied. Conversely, if the rate of use is less than or equal to the predetermined or programmed value, the intelligent thermostat 540 determines that the home environment is unoccupied and controls the appliances and HVAC system accordingly.

Although the invention has been described in terms of the intelligent thermostat 540 analyzing the data, the analysis could be performed by the electronic controller of the meter. In this embodiment, the meter would communicate only an occupied or unoccupied signal to the intelligent thermostat 540, which would then accordingly control the appliances and/or the HVAC system. However, in a preferred embodiment the thermostat ultimately determines if the dwelling is occupied over the electronic controller of the appliances because the thermostat can take all the occupancy information from the various appliances and process it to determine whether or not the home is occupied.

The interaction between the appliances and the thermostat of the present invention is beneficial because the system can automatically determine if the home environment 500 is occupied or unoccupied. In the unoccupied state, the intelligent thermostat 540 may shut down, lockout, or change the operating mode of appliances to reduce energy consumption. For example, by using the methods explained previously, the intelligent thermostat 540 may control the hot water heater 510 to reduce energy consumed thereby, according to methods explained above. Similarly, other heating devices such as the jacuzzi 522 or heater 524 for a swimming pool could be switched to an energy conserving or vacation mode. By automatically determining an unoccupied state, the intelligent thermostat 540 may automatically control the HVAC system such as reducing the temperature settings for the home during the winter or increasing the temperature settings during the summer to prevent unnecessary use of the HVAC system if the user has failed to manually adjust the intelligent thermostat 540.

As discussed above, the user may directly input into the intelligent thermostat 540 that the intelligent thermostat 540 should enter the vacation or energy savings setting. In this embodiment, the intelligent thermostat 540 can use this direct input information to switch appropriate appliances to an energy saving mode, as explained previously. When the user returns to the home environment 500 and resets the HVAC system, the intelligent thermostat 540 can automatically reset the operation mode of the appliances as well. Alternatively, the intelligent thermostat my automatically exit this mode when occupancy information received indicates that the occupants have returned.

Because the appliances may communicate with the intelligent thermostat 540, the intelligent thermostat 540 can be programmed to more optimally control of the HVAC system and/or other appliances within the home environment 500 under other conditions than merely when the house is unoccupied. One particular benefit and feature is that heat producing appliances such as the microwave oven, the range/oven, the clothes drier, water heater, and the like, can send additional user input information to the intelligent thermostat 540.

One particular piece of user input information that can be communicated to the thermostat 540 is heat dissipation information. For example, when a range/oven 520 is activated, regardless how energy efficient the appliance, heat energy is dissipated into the localized environment of the range/oven 520, i.e. the kitchen 560, causing the environmental conditions of that location to change. Particularly, the temperature and humidity of the kitchen 560 will rise.

Unfortunately, as is illustrated in FIG. 5, the intelligent thermostat 540, which controls the HVAC system, may be far away from the location of the localized environmental change. As such, the localized temperature change in the kitchen 560 will not be read by the intelligent thermostat 540 until after at least an extended period of time. Even if the thermostat 540 is close to the heat dissipating device 520, an extended period of time may pass before the localized environment 560 is returned to a comfortable state.

However, with one embodiment of the present invention, the heat producing appliance, i.e. the range/oven 520, can send information to the intelligent thermostat 540 to indicate that it is producing heat and that the localized environmental conditions in the kitchen 560 will change. Thus, the intelligent thermostat 540 can activate and control the HVAC system preemptively, concurrently, subsequently, or any combination thereof to condition the kitchen 560 in response to a heat producing appliance being activated, rather than relying solely on being able to directly sense the environmental change resulting therefrom.

In a preemptive mode, the HVAC system conditions the air, at least in the local environment, to a temperature below the thermostat read temperature so that as the range/oven 520 is used, the kitchen's temperature rises to approach the desired temperature. During a concurrent mode, the HVAC system is run currently as the range/oven 520 is being used. Preferably, the HVAC system removes heat at the same rate that the heat producing appliance is dissipating heat into the environment. During a subsequent mode, the intelligent thermostat 540 waits a predetermined time or after a predetermined amount of heat energy has been dissipated prior to activating the HVAC system. This mode is beneficial because it prevents unnecessary activation and deactivation of the HVAC system if the heat producing appliance is not operated long enough to significantly effect the environment.

In an embodiment, the electronic controller of the heat producing appliance is programmed to transmit specific heat emission data to the intelligent thermostat 540 so that the HVAC system may be optimally activated. This data may include the appliance's temperature setting, a timer setting, a mode of operation setting, a level of operation, or even specific quantities of energy dissipated. With this information, the intelligent thermostat 540 determines when the HVAC system should be activated to remove a similar amount of heat energy from the localized environment. This information is a further type of user input information.

In a further embodiment, the intelligent thermostat 540 and HVAC system are configured and programmed such that the HVAC system may independently condition individual localized environments within the home environment 500. Thus, the HVAC system may independently condition various rooms in the home environment 500 so that one room such as the kitchen 560 may be conditioned while another room such as the living room 562 remains unconditioned. This is extremely beneficial when the source of heat is localized and the rest of the home environment 500 does not need to be conditioned, which significantly conserves energy consumption.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for controlling operation of at least one appliance within a dwelling, comprising:
at least one appliance having an electronic controller operable to control the at least one appliance; and
an intelligent thermostat remotely located from the at least one appliance for controlling at least a dwelling's heating, ventilating and air conditioning (HVAC) system, the intelligent thermostat operably coupled to the electronic controller for communications therewith, the intelligent thermostat adapted to control operation of the HVAC system and the at least one appliance in response to communication between the at least one appliance and the intelligent thermostat; and
wherein the at least one appliance has at least one occupancy sensor for sensing occupancy information of the dwelling, and wherein the electronic controller communicates the sensed occupancy information to the intelligent thermostat, and wherein the intelligent thermostat processes the occupancy information to determine if the occupancy state of the dwelling is one of an occupied state and an unoccupied state; and
wherein the intelligent thermostat transmits a command to the electronic controller to operate the at least one appliance in an energy saving mode when the intelligent determines that the occupancy state of the dwelling is in the unoccupied state.

2. The system of claim 1, wherein the occupancy information sensed by the at least one occupancy sensor includes a user's manipulation of at least one input control of the at least one appliance.

3. The system of claim 2, wherein the at least one input control of the at least one appliance includes at least one of a button, a switch, a dial and a touch screen.

4. The system of claim 1, wherein the at least one appliance includes a plurality of appliances having at least one occupancy sensor and an electronic controller operable to control the appliance and operably coupled to the intelligent thermostat for communication therewith, and wherein the thermostat operates to control the operation of all of the plurality of appliances according to the determined occupancy state of the dwelling.

5. The system of claim 1, wherein the intelligent thermostat transmits an appliance vacation mode control signal to the at least one appliance when the thermostat determines that the dwelling is in the unoccupied state to initiate an appliance vacation mode within the electronic controller.

6. The system of claim 5, wherein the intelligent thermostat transmits a cancel appliance vacation mode control signal to the at least on appliance when the thermostat determines that the dwelling has returned to the occupied state.

7. The system of claim 5, wherein the intelligent thermostat controls the HVAC system according to an occupied mode setting for the HVAC system when the intelligent thermostat determines the dwelling is in the occupied state.

8. The system of claim 1, wherein the intelligent thermostat is operably coupled to the electronic controller of the at least one appliance for communications via a wireless communication channel.

9. The system of claim 1, wherein the intelligent thermostat is operably coupled to the electronic controller of the at least one appliance for communications via a wired communications channel.

10. The system of claim 1, wherein the at least one appliance includes at least one of a door, lid, latch, lock, and handle, and wherein the occupancy information sensed by the at least one occupancy sensor includes a user's manipulation of at least one of the at least one of a door, lid, latch, lock, and handle.

11. A system for controlling operation of at least one appliance within a dwelling, comprising:
at least one appliance having an electronic controller operable to control the at least one appliance;
an intelligent thermostat remotely located from the at least one appliance for controlling at least a dwelling's heating, ventilating and air conditioning (HVAC) system, the intelligent thermostat operably coupled to the electronic controller for communications therewith to control operation of at least one of the HVAC system and the at least one appliance in response to communication between the at least one appliance and the intelligent thermostat; and
wherein the at least one appliance includes at least one heat producing appliance that dissipates heat energy into the dwelling, and wherein the electronic controller of the at least one heat producing appliance communicates operational information of the heat producing appliance to the intelligent thermostat, and wherein the intelligent thermostat activates the HVAC system to cool at least a localized environment of the heat producing appliance in response to the operational information despite a sensed temperature at the intelligent thermostat being below an activation set point for the HVAC system.

12. The system of claim 11, wherein the operational information includes at least one of a user determined mode of operation, a user determined length of operation, a user determined temperature setting, or an appliance determined energy dissipation quantity.

13. The system of claim 11, wherein the HVAC system can independently condition a plurality of localized environments of the dwelling, and the intelligent thermostat activates the HVAC system to condition only the localized environment of the at least one heat producing appliance in response to receiving the operational information.

14. The system of claim 11, wherein the intelligent thermostat is configured to provide a user selectable HVAC vacation mode setting for the HVAC system, and wherein the intelligent thermostat transmits an appliance vacation mode control signal to the electronic controller of the at least one appliance when the user selectable HVAC vacation mode has been selected to initiate an appliance vacation mode.

15. A method of controlling at least one appliance and a heating, ventilating, and air conditioning (HVAC) system of a dwelling, comprising the steps of:
receiving by a thermostat user input information from the at least one appliance;
processing by the thermostat the received user input information;
transmitting by the thermostat to the at least one of the HVAC system and the at least one appliance a control signal to adjust an operational mode of the at least one HVAC system and appliance; and
wherein the user input information includes appliance activation information input by the user including at least one of a mode of operation, activation of the appliance, a length of operation, or a temperature setting; and
wherein the transmitting step includes transmitting an activation control signal to the HVAC system to activate the HVAC system to cool at least a portion of he dwelling despite a sensed temperature at the thermostat being below an activation set point for the HVAC system.

16. The method of claim 15, wherein the step of processing by the thermostat includes the step of determining the occupancy state of the dwelling including one of an occupied state and an unoccupied state.

17. The method of claim 16, wherein the step of determining the occupancy state includes the steps of:

calculating a time from last receipt of the user input information;

determining that the dwelling is unoccupied when the time exceeds a predetermined value without further receipt of the user input information; and determining that the dwelling is occupied when further user input information is received by the thermostat.

18. The method of claim 15, wherein the step of transmitting includes transmitting a control signal to adjust the operational mode of at least one of the HVAC system and the at least one appliance to a vacation mode.

* * * * *